US012269389B2

(12) United States Patent
Azzouz

(10) Patent No.: US 12,269,389 B2
(45) Date of Patent: Apr. 8, 2025

(54) VEHICLE ASSEMBLY HAVING MID-GATE WITH PASS-THROUGH OPENING AND CARGO ACCOMMODATING METHOD

(71) Applicant: Ford Global Technologies, LLC, Dearborn, MI (US)

(72) Inventor: Michael M. Azzouz, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 302 days.

(21) Appl. No.: 17/977,127

(22) Filed: Oct. 31, 2022

(65) Prior Publication Data

US 2024/0140297 A1 May 2, 2024

(51) Int. Cl.
*B62D 33/02* (2006.01)
*B60P 3/42* (2006.01)
*B62D 33/03* (2006.01)
*B62D 33/037* (2006.01)

(52) U.S. Cl.
CPC .............. *B60P 3/423* (2013.01); *B62D 33/03* (2013.01); *B62D 33/037* (2013.01)

(58) Field of Classification Search
CPC ........ B62D 25/24; B62D 33/03; B62D 33/08; B62D 33/037; B62D 33/02; B62D 47/003; B62D 33/0273; B62D 33/06; B60J 1/1861; B60J 5/108; B60J 7/041; B60J 7/1621; B60P 3/423; B60R 5/006; B60R 5/041; B60R 21/026; E05Y 2900/544; B60N 2/36
USPC ....... 296/26.11, 37.6, 37.16, 50, 57.1, 146.1, 296/146.16, 190.11
See application file for complete search history.

(56) References Cited

U.S. PATENT DOCUMENTS

| 4,767,149 A | * | 8/1988 | Rye | B60R 13/01 224/543 |
| 5,427,425 A | * | 6/1995 | Droesch | B62D 33/0273 296/57.1 |
| 5,934,727 A | * | 8/1999 | Storc | B62D 33/0273 296/26.11 |
| 6,209,366 B1 | * | 4/2001 | Zagoroff | E05B 77/44 292/DIG. 3 |
| 6,416,104 B1 | | 7/2002 | Fisher et al. | |
| 6,478,355 B1 | | 11/2002 | Van Eden et al. | |
| 6,513,863 B1 | * | 2/2003 | Renke | B60P 3/423 296/57.1 |

(Continued)

OTHER PUBLICATIONS

Dealerinspire, What does it mean if a car is unibody?, May 24, 2021, CMA's Honda of Winchester, https://www.cmashondaofwinchester.com/what-does-it-mean-if-a-car-is-unibody/ (Year: 2021) (Year: 2021).*

*Primary Examiner* — Amy R Weisberg
*Assistant Examiner* — Whitney Nicole Francis
(74) *Attorney, Agent, or Firm* — Vichit Chea; Carlson, Gaskey & Olds, P.C.

(57) ABSTRACT

A vehicle assembly includes a mid-gate assembly disposed between a passenger compartment and a cargo bed of a vehicle. The mid-gate assembly has a pass-through opening and a hatch that is pivotably coupled to the mid-gate assembly at a position vertically above a floor of the cargo bed. The hatch is configured to move back-and-forth between a closed position that closes the pass-through opening and an open position that permits access between the passenger compartment and the cargo bed through the pass-through opening.

20 Claims, 2 Drawing Sheets

(56) References Cited

U.S. PATENT DOCUMENTS

| | | | | |
|---|---|---|---|---|
| 6,575,515 | B2* | 6/2003 | Hashimoto | B62D 47/003 |
| | | | | 296/26.11 |
| 6,695,394 | B2 | 2/2004 | Takahashi | |
| 6,786,535 | B1* | 9/2004 | Grzegorzewski | B60N 2/3013 |
| | | | | 296/37.16 |
| 6,796,600 | B1* | 9/2004 | Ferer | B60P 3/423 |
| | | | | 296/37.6 |
| 6,959,960 | B2* | 11/2005 | Buccinna | B60N 2/3031 |
| | | | | 296/26.11 |
| 10,350,972 | B2* | 7/2019 | Azzouz | B60J 5/00 |
| 10,703,422 | B2 | 7/2020 | Wilson et al. | |
| 11,414,137 | B2 | 8/2022 | Simonin et al. | |
| 12,091,097 | B2* | 9/2024 | Harmon | E05F 15/605 |
| 2002/0089204 | A1 | 7/2002 | Fisher et al. | |
| 2004/0026948 | A1* | 2/2004 | Novajovsky | B62D 33/0273 |
| | | | | 296/26.08 |
| 2004/0232722 | A1* | 11/2004 | Kharod | B60P 3/423 |
| | | | | 296/146.4 |
| 2005/0057062 | A1* | 3/2005 | McClure | B60R 13/01 |
| | | | | 296/37.6 |
| 2009/0039675 | A1* | 2/2009 | King | B60P 3/423 |
| | | | | 296/182.1 |
| 2009/0121520 | A1* | 5/2009 | Polewarczyk | B60J 1/1861 |
| | | | | 296/190.11 |
| 2014/0306425 | A1* | 10/2014 | Atkinson | B60D 1/46 |
| | | | | 280/414.5 |
| 2022/0136297 | A1* | 5/2022 | Roberson | E05D 15/262 |
| | | | | 49/37 |
| 2022/0177052 | A1* | 6/2022 | Harmon | E05F 15/605 |
| 2022/0266915 | A1* | 8/2022 | Salter | B60J 5/108 |
| 2024/0116582 | A1* | 4/2024 | de Salvi | B60P 7/14 |

* cited by examiner

VEHICLE ASSEMBLY HAVING MID-GATE WITH PASS-THROUGH OPENING AND CARGO ACCOMMODATING METHOD

TECHNICAL FIELD

This disclosure relates generally to a hatch that can open when access to a pass-through opening between a passenger compartment and a cargo bed of a vehicle is needed.

BACKGROUND

Some vehicles, such as unibody pickups, include a wall or a mid-gate assembly between a passenger compartment and a cargo bed. Loading cargo into the cargo bed can be challenging. Further, a user may desire to use the vehicle to transport cargo that cannot be accommodated within the cargo bed.

SUMMARY

In some aspects, the techniques described herein relate to a vehicle assembly, including: a mid-gate assembly disposed between a passenger compartment and a cargo bed of a vehicle, the mid-gate assembly having a pass-through opening; and a hatch that is pivotably coupled to the mid-gate assembly at a position vertically above a floor of the cargo bed, the hatch configured to move back-and-forth between a closed position that closes the pass-through opening and an open position that permits access between the passenger compartment and the cargo bed through the pass-through opening.

In some aspects, the techniques described herein relate to a vehicle assembly, wherein the hatch is pivoted into the cargo bed when the hatch is in the open position.

In some aspects, the techniques described herein relate to a vehicle assembly, further including a passenger side sidewall of the cargo bed and a driver side sidewall of the cargo bed, the passenger side sidewall and the driver side sidewall each include a shelf having a support surface configured to support the hatch when the hatch is in the open position.

In some aspects, the techniques described herein relate to a vehicle assembly, wherein the hatch spans from the shelf of the driver side sidewall to the shelf of the passenger side sidewall when the hatch is in the open position.

In some aspects, the techniques described herein relate to a vehicle assembly, wherein the hatch pivots back-and-forth about a pivot axis between the open position and the closed position, the pivot axis vertically aligned with the support surface of the shelf on the passenger side sidewall and vertically aligned with the support surface of the shelf on the driver side sidewall.

In some aspects, the techniques described herein relate to a vehicle assembly, wherein the passenger side sidewall includes a passenger side wheel well, and the driver side sidewall includes a driver side wheel well, the shelf of the passenger side sidewall disposed between the passenger side wheel well and the mid-gate assembly, the shelf of the driver side sidewall disposed between the driver side wheel well and the mid-gate assembly.

In some aspects, the techniques described herein relate to a vehicle assembly, wherein the hatch includes a first side and an opposite, second side, the first side facing the passenger compartment and facing forward in the vehicle when the hatch is in the closed position, the second side facing the cargo bed and facing rearward in the vehicle when the hatch is in the closed position, wherein, when the hatch in the open position, the first side is vertically aligned with vertically uppermost surfaces of the passenger side wheel well and the driver side wheel well.

In some aspects, the techniques described herein relate to a vehicle assembly, wherein at least the first side is provided by a polymer-based material.

In some aspects, the techniques described herein relate to a vehicle assembly, wherein the hatch is elevated a distance away from the floor of the cargo bed when the hatch is in the open position.

In some aspects, the techniques described herein relate to a vehicle assembly, wherein the mid-gate assembly includes a single hat-shaped cross-section above the pass-through opening and below a rear window of the vehicle, the single hat-shaped cross-section extending longitudinally in a cross-vehicle direction.

In some aspects, the techniques described herein relate to a vehicle assembly, wherein the vehicle is a unibody pickup.

In some aspects, the techniques described herein relate to a vehicle assembly, wherein the hatch includes a latch assembly having a cam is configured to retract and extend at least one lock rod, the at least one lock rod configured to latch the hatch in the closed position when extended.

In some aspects, the techniques described herein relate to a vehicle cargo accommodating method, including: pivoting a hatch about a pivot axis from a closed position to an open position to permit access between a passenger compartment and a cargo bed through a pass-through opening that is within a mid-gate assembly of a vehicle, the pivot axis elevated a distance from a floor of the cargo bed.

In some aspects, the techniques described herein relate to a method, further including resting the hatch on a shelf of a passenger side sidewall and a shelf of a driver side sidewall when the hatch is in the open position.

In some aspects, the techniques described herein relate to a method, wherein the pivot axis is vertically aligned with a support surface of the shelf of the passenger side sidewall and with a support surface of the shelf of the driver side sidewall.

In some aspects, the techniques described herein relate to a method, wherein the hatch is spaced from the cargo bed floor when in the open position.

In some aspects, the techniques described herein relate to a method, wherein the hatch includes a first side and an opposite, second side, the first side facing the passenger compartment and facing forward in the vehicle when the hatch is in the closed position, the second side facing the cargo bed and facing rearward in the vehicle when the hatch is in the closed position, wherein, when the hatch in the open position, the first side is vertically aligned with a vertically uppermost surface of a wheel well on a passenger side of the cargo bed and with a vertically uppermost surface of a wheel well on a driver side of the cargo bed.

In some aspects, the techniques described herein relate to a method, further including supporting cargo on the first side when the hatch is in the open position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a mid-gate having an opening that can be covered by a hatch. When the hatch is opened, the hatch is elevated above a floor of a cargo bed. The hatch in this position can facilitate loading cargo and can reduce a potential for moisture and contaminants entering a passenger compartment through the opening.

Figure 1:
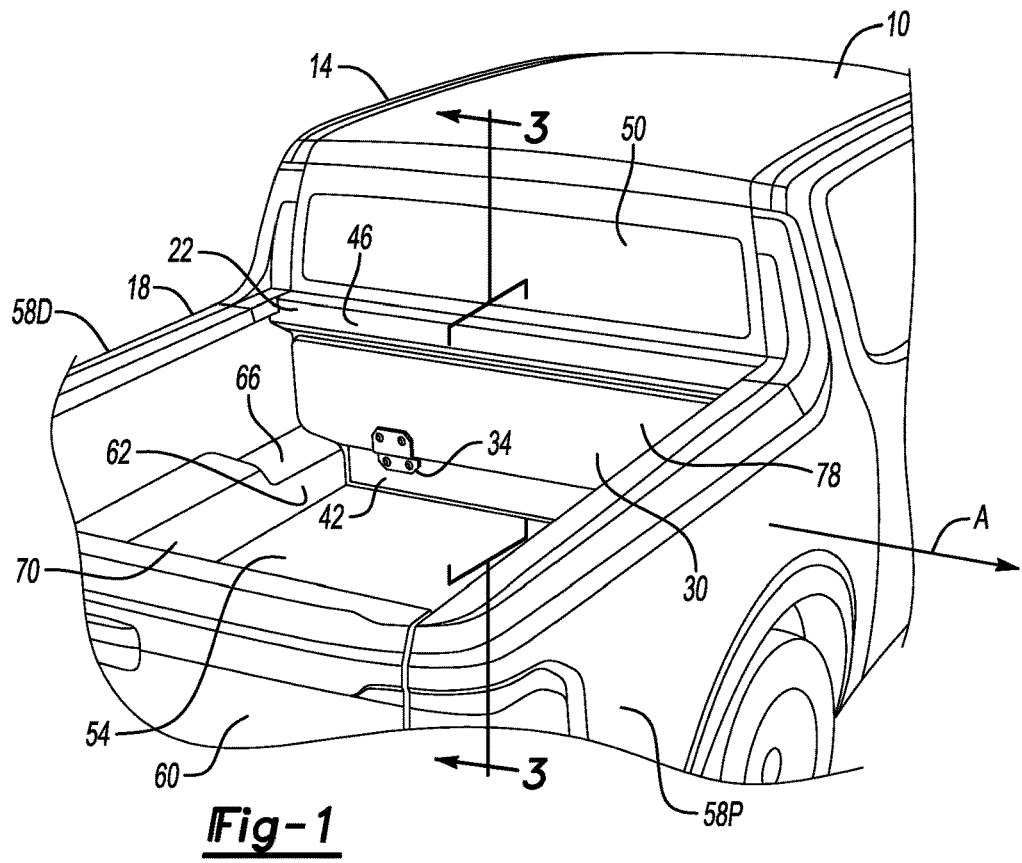
FIG. 1 illustrates a perspective view of a vehicle having a mid-gate and a hatch in a closed position according to an exemplary aspect of the present disclosure.
Figure 2:
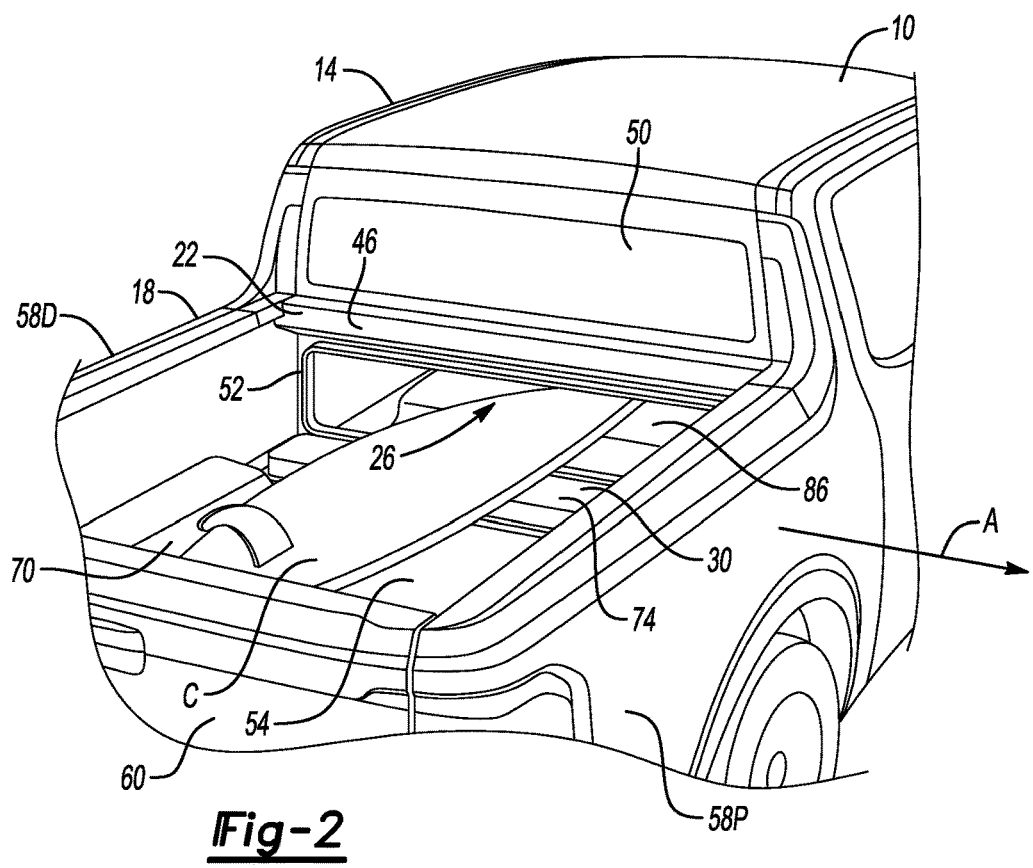
FIG. 2 illustrates a perspective view of the vehicle of FIG. 1 when the hatch is in an open position and supporting cargo.

With reference to FIGS. 1 and 2, a vehicle 10 includes a passenger compartment 14 and a cargo bed 18. The passenger compartment 14 is in front of the cargo bed 18. The vehicle 10, in the exemplary embodiment, is a pickup truck and, more specifically, a unibody pickup truck. For purposes of this disclosure, a unibody pickup could include a single unit body on a full frame.

A mid-gate assembly 22 is disposed between a passenger compartment 14 and a cargo bed 18 of a vehicle 10. The mid-gate assembly 22 has a pass-through opening 26.

A hatch 30 is pivotably coupled to the mid-gate assembly 22 via, in this example, a pair of hinges 34. The hatch 30 is configured to move back-and-forth between a closed position as shown in FIG. 1 and an open position as shown in FIG. 2. In the closed position, the hatch 30 closes the pass-through opening 26. In the open position, the hatch 30 pivots into the cargo bed 18 to permit access between the passenger compartment 14 and the cargo bed 18 through the pass-through opening 26.

When the hatch 30 is in the open position, cargo C can be accommodated within both the cargo bed 18 and the passenger compartment 14 The cargo C, here a surfboard, can extend from the cargo bed 18 through the pass-through opening 26 into the passenger compartment 14. The pass-through opening 26 enables the vehicle 10 to accommodate larger cargo (sheets of drywall, lumber, plywood, etc.) than what could be accommodated using only the cargo bed 18.

The mid-gate assembly 22 includes a lower panel portion 42 that is between the pass-through opening 26 and the hatch 30. In this example, the hinges 34 connect to the lower panel portion 42.

Figure 3:
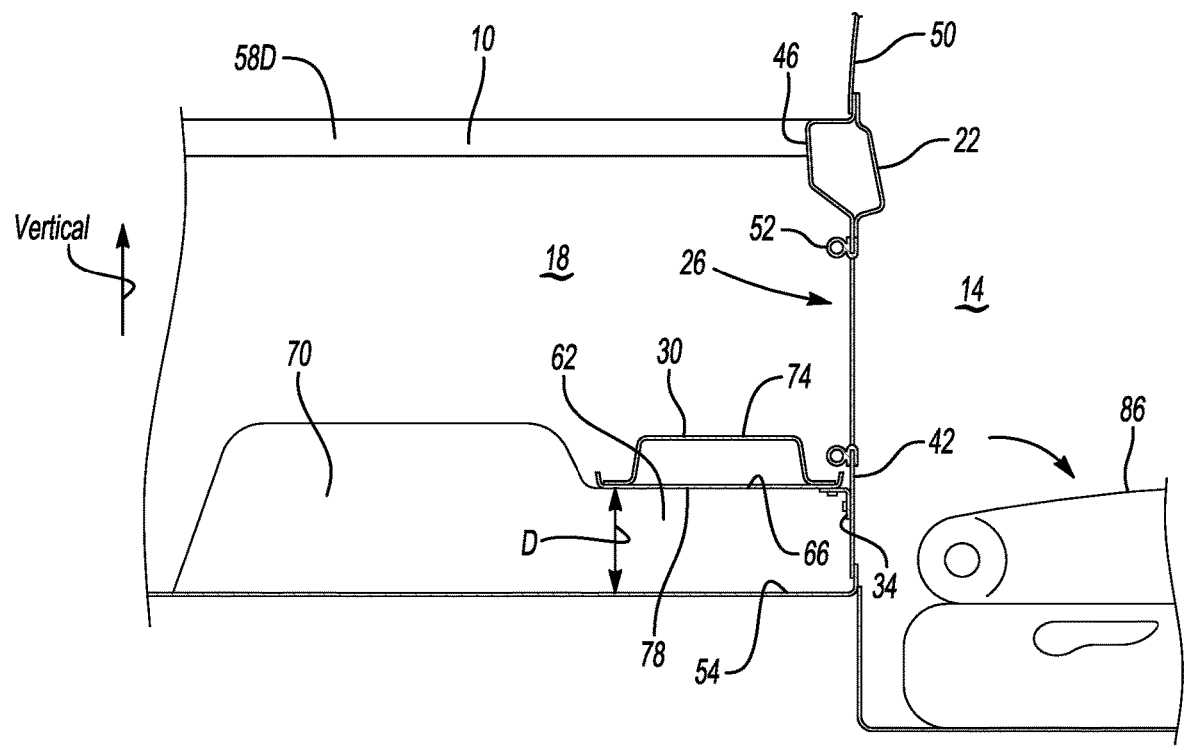
FIG. 3 illustrates a section view taken at line 3-3 in FIG. 2.

Referring now to FIG. 3 with continuing reference to FIGS. 1 and 2, the mid-gate assembly 22 also includes an upper portion 46 having, in this example, one double-hat cross-section that extends longitudinally in a cross-vehicle direction. The double-hat cross-section is vertically between a rear window 50 of the vehicle 10 and the pass-through opening 26. Vertical, for purposes of this disclosure, is with reference to ground and a general orientation of the vehicle 10 during operation.

The mid-gate assembly 22 includes, in this example, a seal 52 that extends about the pass-through opening 26. The hatch 30 compresses the seal 52 when the hatch 30 is in the closed position. The seal 52 can help to seal the interface between the mid-gate assembly 22 and the hatch 30.

The cargo bed 18 includes a floor 54, a driver side sidewall 58D, a passenger side sidewall 58P, and a tailgate 60. The geometry of passenger side sidewall 58P is substantially a reflection of a geometry of the driver side sidewall 58D.

The driver side sidewall 58D and the passenger side sidewall 58P each include a shelf 62 having a support surface 66. The driver side sidewall 58D and the passenger side sidewall 58P also each include a wheel well 70. The shelves 62 are disposed between the mid-gate assembly 22 and the wheel wells 70.

When the hatch 30 is pivoted into the cargo bed 18 to a fully open position, the hatch 30 rests on the support surfaces 66 of the shelves 62. In particular, when the hatch 30 is in the fully open position, the hatch 30 spans from the shelf 62 of the driver side sidewall 58D to the shelf 62 of the passenger side sidewall 58P. The hatch 30, when supported on the shelves 62, is elevated a distance D away from the floor 54 when the hatch 30 is in the open position. As required, the hatch 30 could also move to open positions that are not a fully open position.

The hatch 30 pivots about a pivot axis A into the cargo bed 18. The pivot axis A is vertically above a floor 54 of the cargo bed 18. The pivot axis A is vertically aligned with the support surfaces 66 of the shelves 62 in this example.

The hatch 30 includes a first side 74 and an opposite, second side 78. When the hatch 30 is in the closed position, the first side 74 faces forward to the passenger compartment 14 and the second side 78 faces rearward to the cargo bed 18. When the hatch 30 is in the open position, the first side 74 faces vertically upward and is substantially vertically aligned with vertically uppermost surfaces of the wheel wells 70.

This provides a support surface for reliably supporting cargo, such as the cargo C. Filling the open areas between the wheel wells 70 and the mid-gate assembly 22 with the hatch 30 in the open position also facilitates loading. Cargo, such as sheets of material, can be slid over the tailgate 60, the wheel wells 70, and then the first side 74 without the cargo getting caught within open areas between the wheel wells 70 and the mid-gate assembly 22.

The uppermost surfaces of the wheel wells 70, the first side 74 of the hatch 30, can also be aligned with an upper edge of the tailgate 60 when the tailgate 60 is secured in a partially open position. Cargo can then remain level when supported on the upper edge of the tailgate 60, the wheel wells 70, and the first side 74.

Figure 4:
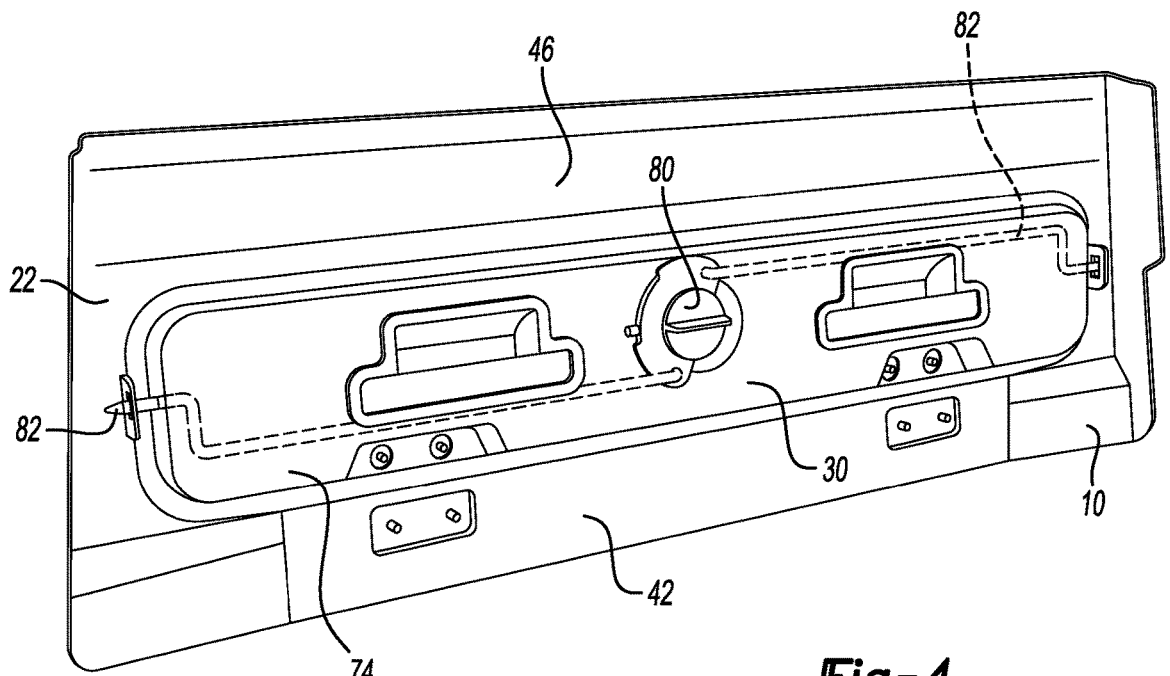
FIG. 4 illustrates a perspective view of the hatch from inside a passenger compartment of the vehicle when the hatch is in the closed position.

FIG. 4 shows the first side 74 of the hatch 30 when the hatch 30 is in the closed position. At least the first side 74 is provided by a polymer-based material.

The hatch 30 includes a latch assembly having a cam linked to a handle 80 and at least one lock rod 82. The handle 80 can be actuated from the first side 74. Actuating the handle 80 can move the cam to retract the at least one lock rod 82 from engaging the mid-gate assembly 22. This unlatches the hatch 30 from the mid-gate assembly 22 so that the mid-gate assembly 22 can be moved to the open position.

Pivoting the hatch 30 about the pivot axis A from the closed position to the open position permit access between the passenger compartment 14 and a cargo bed 18 through the pass-through opening 26. The vehicle 10 includes rear row seats 86 that are folded forward to provide access to the handle 80. The rear row seats 86 can remain folded to provide space for cargo extending through the pass-through opening 26 into the passenger compartment 14.

As the hatch 30 opens into the cargo bed 18 rather than the passenger compartment 14, the rear row seats 86 are still available for accommodating passengers when the hatch 30 is open. In some examples, the rear row seats 86 could be a 50/50 split or 60/40 bench. In such examples, only part of the rear row seats 86 could be folded forward to provide room for cargo. The remaining portion of the rear row seats 86 can remain upright and accommodate a passenger.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle assembly, comprising:
   a mid-gate assembly disposed between a passenger compartment and a cargo bed of a vehicle, the mid-gate assembly having a pass-through opening;
   a hatch that is pivotably coupled to the mid-gate assembly at a position vertically above a floor of the cargo bed, the hatch configured to move back-and-forth between a closed position where the hatch closes the pass-through opening and an open position permitting access between the passenger compartment and the cargo bed through the pass-through opening; and
   a passenger side sidewall of the cargo bed and a driver side sidewall of the cargo bed, the passenger side sidewall and the driver side sidewall each include a shelf having a support surface configured to support the hatch when the hatch is in the open position,
   wherein the passenger side sidewall includes a passenger side wheel well, and the driver side sidewall includes a driver side wheel well, the shelf of the passenger side sidewall disposed between the passenger side wheel well and the mid-gate assembly, the shelf of the driver side sidewall disposed between the driver side wheel well and the mid-gate assembly,
   wherein the hatch includes a first side and an opposite, second side, the first side facing the passenger compartment and facing forward in the vehicle when the hatch is in the closed position, the second side facing the cargo bed and facing rearward in the vehicle when the hatch is in the closed position,
   wherein, when the hatch in the open position, the first side is vertically aligned with vertically uppermost surfaces of the passenger side wheel well and the driver side wheel well.

2. The vehicle assembly of claim 1, wherein the hatch is pivoted into the cargo bed when the hatch is in the open position.

3. The vehicle assembly of claim 1, wherein the hatch spans from the shelf of the driver side sidewall to the shelf of the passenger side sidewall when the hatch is in the open position.

4. The vehicle assembly of claim 1, wherein the hatch pivots back-and-forth about a pivot axis between the open position and the closed position, the pivot axis vertically aligned with the support surface of the shelf on the passenger side sidewall and vertically aligned with the support surface of the shelf on the driver side sidewall.

5. The vehicle assembly of claim 1, wherein at least the first side is provided by a polymer-based material.

6. The vehicle assembly of claim 1, wherein the hatch is elevated a distance away from the floor of the cargo bed when the hatch is in the open position.

7. The vehicle assembly of claim 1, wherein the mid-gate assembly includes no more than one double-hat cross-section above the pass-through opening and below a rear window of the vehicle, the double-hat cross-section extending longitudinally in a cross-vehicle direction.

8. The vehicle assembly of claim 1, wherein the vehicle is a unibody pickup.

9. The vehicle assembly of claim 1, wherein the hatch includes a latch assembly having a cam is configured to retract and extend at least one lock rod, the at least one lock rod configured to latch the hatch in the closed position when extended.

10. A vehicle cargo accommodating method, comprising:
    pivoting a hatch about a pivot axis from a closed position to an open position to permit access between a passenger compartment and a cargo bed through a pass-through opening that is within a mid-gate assembly of a vehicle, the pivot axis elevated a distance from a floor of the cargo bed; and
    resting the hatch on a shelf of a passenger side sidewall and a shelf of a driver side sidewall when the hatch is in the open position,
    wherein the hatch includes a first side and an opposite, second side, the first side facing the passenger compartment and facing forward in the vehicle when the hatch is in the closed position, the second side facing the cargo bed and facing rearward in the vehicle when the hatch is in the closed position,
    wherein, when the hatch in the open position, the first side is vertically aligned with a vertically uppermost surface of a wheel well on a passenger side of the cargo bed and with a vertically uppermost surface of a wheel well on a driver side of the cargo bed.

11. The method of claim 10, wherein the pivot axis is vertically aligned with a support surface of the shelf of the passenger side sidewall and with a support surface of the shelf of the driver side sidewall.

12. The method of claim 10, wherein the hatch is spaced from the floor when in the open position.

13. The method of claim 10, further comprising supporting cargo on the first side when the hatch is in the open position.

14. The vehicle assembly of claim 1, wherein the support surface of the shelf of the passenger side sidewall is disposed vertically beneath a vertically uppermost surface of the passenger side wheel well, wherein the support surface of the shelf of the driver side sidewall is disposed vertically beneath a vertically uppermost surface of the driver side wheel well.

15. The vehicle assembly of claim 1, wherein the hatch in the open position is spaced a distance from both the passenger side wheel well and the driver side wheel well such that no portion of the hatch contacts the passenger side wheel well or the driver side wheel well when the hatch is in the open position.

16. The vehicle assembly of claim 1, wherein the hatch includes a latch assembly that holds the hatch in the closed position when in a latched position, the latch assembly having a handle that can be actuated to transition the latch assembly to an unlatched position, the handle accessible within the passenger compartment.

17. The method of claim 10, wherein the shelf of the passenger side sidewall has a passenger side support surface to support the hatch in the open position, the passenger side support surface disposed vertically beneath a vertically uppermost surface of the passenger side wheel well, wherein the shelf of the driver side sidewall has a driver side support surface to support the hatch in the open position, the driver side support surface disposed vertically beneath a vertically uppermost surface of the driver side wheel well.

18. The method of claim 10, wherein the hatch in the open position is spaced a distance from both the wheel well on the passenger side and the wheel well on the driver side such that no portion of the hatch contacts the wheel well on the passenger side or the wheel well on the driver side when the hatch is in the open position.

19. The method of claim 10, further comprising, from within the passenger compartment, unlatching a latch assembly to permit movement of the hatch from the closed position to the open position.

20. A vehicle assembly, comprising:
   a mid-gate assembly disposed between a passenger compartment and a cargo bed of a vehicle, the mid-gate assembly having a pass-through opening;
   a passenger side sidewall of the cargo bed, the passenger side sidewall having a passenger side wheel well and a passenger side shelf that is between the passenger side wheel well and the mid-gate assembly, the passenger side shelf having a passenger side support surface that is disposed vertically beneath a vertically uppermost surface of the passenger side wheel well;
   a driver side sidewall of the cargo bed, the driver side sidewall having a driver side wheel well and a driver side shelf that is between the passenger side wheel well and the mid-gate assembly, the driver side shelf having a driver side support surface that is disposed vertically beneath a vertically uppermost surface of the driver side wheel well; and
   a hatch that is pivotably coupled to the mid-gate assembly at a position vertically above a floor of the cargo bed, the hatch configured to move back-and-forth between a closed position where the hatch closes the pass-through opening and an open position permitting access between the passenger compartment and the cargo bed through the pass-through opening,
   the hatch includes a first side and an opposite, second side, the first side exposed within the passenger compartment and facing forward in the vehicle when the hatch is in the closed position, the second side facing the cargo bed and facing rearward in the vehicle when the hatch is in the closed position,
   when the hatch in the open position, the hatch spans from the driver side support surface to the passenger side support surface without contacting the passenger side wheel well and the driver side wheel well, when the hatch is in the open position, the first side is vertically aligned with vertically uppermost surfaces of the passenger side wheel well and the driver side wheel well.

\* \* \* \* \*